United States Patent
Jones

(10) Patent No.: US 11,972,020 B2
(45) Date of Patent: *Apr. 30, 2024

(54) FLEXIBLE FORMAT ENCRYPTION

(71) Applicant: Capital One Services, LLC, McLean, VA (US)

(72) Inventor: Trent Jones, Mckinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,073

(22) Filed: Apr. 27, 2023

(65) Prior Publication Data

US 2023/0334424 A1    Oct. 19, 2023

Related U.S. Application Data

(63) Continuation of application No. 16/882,137, filed on May 22, 2020, now Pat. No. 11,676,103.

(Continued)

(51) Int. Cl.
*G06F 21/00* (2013.01)
*G06F 9/445* (2018.01)
(Continued)

(52) U.S. Cl.
CPC ...... *G06F 21/6245* (2013.01); *G06F 9/44505* (2013.01); *G06F 9/54* (2013.01); *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01);
(Continued)

(58) Field of Classification Search
None
See application file for complete search history.

(56) References Cited

U.S. PATENT DOCUMENTS 6,029,149 A    2/2000   Dykstra et al.
6,208,979 B1   3/2001   Sinclair
(Continued)

FOREIGN PATENT DOCUMENTS

EP    3723341 A1       10/2020
WO    2015136503 A1    9/2015

OTHER PUBLICATIONS

NPL Search (Google Scholar) (Year: 2020).
(Continued)

*Primary Examiner* — Andrew J Steinle
(74) *Attorney, Agent, or Firm* — Sterne, Kessler, Goldstein & Fox P.L.L.C.

(57) ABSTRACT

Encryption is performed at the field level within a data object, in response to an encryption indicator. Encrypted fields are nulled or zeroed out and the encrypted values are stored in encryption metadata with a path identifying the locations of the encrypted fields. An encrypted data key is appended with a decryption identifier and stored in the encryption metadata. The encrypted data object may be reformatted while encrypted. The encrypted data key is extracted from the encryption metadata and the decryption identifier is used to identify a master key used to decrypt the encrypted data key. The data key is used to decrypt the encrypted values and the decrypted values are stored in the fields identified by the paths.

20 Claims, 6 Drawing Sheets

Related U.S. Application Data

(60) Provisional application No. 62/852,202, filed on May 23, 2019.

(51) Int. Cl.

| | | |
|---|---|---|
| *G06F 9/54* | (2006.01) | |
| *G06F 16/25* | (2019.01) | |
| *G06F 16/955* | (2019.01) | |
| *G06F 18/24* | (2023.01) | |
| *G06F 21/53* | (2013.01) | |
| *G06F 21/60* | (2013.01) | |
| *G06F 21/62* | (2013.01) | |
| *G06F 40/103* | (2020.01) | |
| *G06F 40/174* | (2020.01) | |
| *G06F 40/18* | (2020.01) | |
| *G06N 3/02* | (2006.01) | |
| *G06N 5/025* | (2023.01) | |
| *G06N 20/00* | (2019.01) | |
| *G06Q 10/10* | (2023.01) | |
| *G06Q 20/38* | (2012.01) | |
| *G06Q 20/40* | (2012.01) | |
| *G06Q 30/018* | (2023.01) | |
| *G06Q 30/0201* | (2023.01) | |
| *G06Q 30/0601* | (2023.01) | |
| *G06Q 40/02* | (2023.01) | |
| *G06Q 40/03* | (2023.01) | |
| *H04L 9/08* | (2006.01) | |
| *H04L 9/40* | (2022.01) | |
| *H04L 67/01* | (2022.01) | |
| *G06F 8/65* | (2018.01) | |
| *G06F 8/71* | (2018.01) | |
| *G06K 7/14* | (2006.01) | |
| *G06Q 50/26* | (2012.01) | |

(52) U.S. Cl.
CPC .......... *G06F 21/602* (2013.01); *G06F 21/604* (2013.01); *G06F 21/6227* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 10/10* (2013.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/01* (2022.05); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(56) References Cited

U.S. PATENT DOCUMENTS

| | | |
|---|---|---|
| 7,107,241 B1 | 9/2006 | Pinto |
| 7,860,767 B1 | 12/2010 | Vinci et al. |
| 8,099,605 B1 | 1/2012 | Billsröm et al. |
| 8,666,885 B1 | 3/2014 | Bramlage et al. |
| 8,924,720 B2 | 12/2014 | Raghuram et al. |
| 9,137,228 B1 | 9/2015 | Newstadt |
| 9,646,172 B1 | 5/2017 | Jahn et al. |
| 9,762,616 B2 | 9/2017 | Nagaratnam et al. |
| 9,965,911 B2 | 5/2018 | Wishne |
| 10,033,702 B2 | 7/2018 | Ford et al. |
| 10,171,457 B2 | 1/2019 | Moore et al. |
| 2002/0023051 A1 | 2/2002 | Kunzle et al. |
| 2002/0040339 A1 | 4/2002 | Dhar et al. |
| 2002/0091629 A1 | 7/2002 | Danpour |
| 2003/0036993 A1 | 2/2003 | Parthasarathy |
| 2005/0203834 A1 | 9/2005 | Prieston |
| 2006/0178983 A1 | 8/2006 | Nice et al. |
| 2007/0061248 A1 | 3/2007 | Shavit et al. |
| 2007/0250718 A1 | 10/2007 | Lee et al. |
| 2008/0092240 A1* | 4/2008 | Sitrick ............... H04L 9/0866 726/27 |
| 2009/0327196 A1 | 12/2009 | Studer et al. |
| 2012/0017085 A1 | 1/2012 | Carter et al. |
| 2012/0246061 A1 | 9/2012 | Ericksen |
| 2013/0191629 A1 | 7/2013 | Treinen et al. |
| 2014/0006048 A1 | 1/2014 | Liberty |
| 2014/0189123 A1 | 7/2014 | Dodd et al. |
| 2014/0207571 A1 | 7/2014 | Hammock et al. |
| 2014/0237236 A1 | 8/2014 | Kalinichenko et al. |
| 2014/0304170 A1 | 10/2014 | Spotanski et al. |
| 2015/0026038 A1 | 1/2015 | Alsbrooks |
| 2015/0074407 A1 | 3/2015 | Palmeri et al. |
| 2015/0161364 A1* | 6/2015 | Makarov ............ G06F 21/6218 726/4 |
| 2015/0347770 A1 | 12/2015 | Whalley et al. |
| 2017/0091231 A1 | 3/2017 | DiFranco et al. |
| 2018/0053253 A1 | 2/2018 | Gokhale et al. |
| 2018/0083931 A1* | 3/2018 | Baig ................. G06F 21/6254 |
| 2018/0108105 A1* | 4/2018 | Duesterwald ......... G06F 17/16 |
| 2018/0158139 A1 | 6/2018 | Krajicek et al. |
| 2018/0218121 A1 | 8/2018 | Gassner et al. |
| 2018/0218159 A1* | 8/2018 | Smith, III ........... G06F 21/602 |
| 2018/0332016 A1 | 11/2018 | Pandey et al. |
| 2020/0153814 A1 | 5/2020 | Smolny et al. |
| 2020/0374273 A1 | 11/2020 | Jones |
| 2021/0004479 A1 | 1/2021 | Ithal et al. |

OTHER PUBLICATIONS

Bluttman, Ken, Using the Excel IF Function: Testing on One Condition, published Mar. 22, 2019 (available at https://www.dummies.com/article/technology/software/microsoft-products/excel/using-the-excel-if-function-testing-on-one-condition-259894/) (Year: 2019).

Cheusheva, "Excel IF function: nested IF formulas with multiple conditions, IFERROR, IFNA and more," Apr. 27, 2017 (available at https://web.archive.org/web/20170420035147/https://www.ablebits.com/office-addi ns-blog/2014/ 12/03/excel-if-function-iferrror-ifna/) (Year: 2017).

Cheusheva, Using IF function in Excel: formula examples for numbers, text, dates, blank cells, Apr. 27, 2017 (available at https://web.archive.org/web/20170420035257 /https://www.ablebits.com/office-addins-blog/2014/11 /26/if-function-excel/) (Year: 2017).

N. Naik and P. Jenkins, "Securing digital identities in the cloud by selecting an apposite Federated Identity Management from SAML, OAuth and OpenID Connect," 2017 11th International Conference on Research Challenges In Information Science (RCIS), Brighton, UK, 2017, pp. 163-174. (Year: 2017).

Oasis. "Security Assertion Markup Language (SAML) V2.0 Technical Overview", Sep. 2005. (Year: 2005).

* cited by examiner

FLEXIBLE FORMAT ENCRYPTION

CROSS-REFERENCE TO RELATED APPLICATIONS

This application is a continuation of U.S. application Ser. No. 16/882,137, filed May 22, 22, 2020, entitled "Flexible Format Encryption", which claims the benefit of U.S. Provisional Application No. 62/852,202, filed May 23, 2019, entitled "Multi-Lender Platform" which is incorporated herein by reference in their entirety.

BACKGROUND

Encrypting data can provide security by preventing exposure of sensitive information. However, this security comes at the sacrifice of data manipulation and reformatting capabilities. For example, in a data object or file that is encrypted at the object or file level, data within the object or file cannot be manipulated or reformatted to be stored in a different data structure or file format without first decrypting the data object or file. Appropriate decryption and encryption keys are required to decrypt and re-encrypt an encrypted data object or file during the reformatting process. Entities that do not have the required keys and receive an encrypted data object or file in transit to a final destination are unable to manipulate the encrypted object or file.

BRIEF SUMMARY

A method of encryption comprises storing data in a data object formatted in a first structure. The data object may comprise a first data element and a second data element. The method may comprise encrypting the first data element using a data key, while leaving the second data element of the object unencrypted.

The data object may further comprise an encryption indicator corresponding to the first data element. The encrypting of the first data element of the data object may be performed in response to the encryption indicator, while leaving the second data element of the object unencrypted.

The method may further comprise encrypting the data key.

The method may further comprise storing the data key, encrypted, in metadata of the data object.

The method may further comprise setting the first data element to a null value and storing the encrypted first data element in metadata of the data object. The method may also store, in the metadata of the data object, a first path identifying a location the first data element in the first structure.

The method may further comprise reformatting the data object to a second structure by storing a value from the first data element of the first structure in a first data element of the second structure and storing a value from the second data element of the first structure to a second data element in the second structure. The reformatting may further comprise storing the metadata from the first structure in metadata of the second structure and storing a second path in the metadata of the second structure. The second path may identify a location in the second structure corresponding to the first data element of the second structure.

The method may further comprise sending the data object to a recipient.

A method of decryption comprises receiving a data object formatted in a first structure. The data object may comprise a first data element, a non-encrypted second data element, and metadata comprising an encrypted portion. The method may further comprise decrypting the encrypted portion and storing the decrypted portion in the first data element.

The metadata may comprise an encrypted data key, and the method may further comprise retrieving the encrypted data key from the metadata and recovering a data key through decryption of the encrypted data key. The decrypting may comprise decrypting the encrypted portion using the recovered data key.

The metadata may further comprise a first path identifying a location of the first data element in the first structure. The method may further comprise storing the decrypted portion at the location identified by the first path.

The method may further comprise reformatting the data object in a second structure by storing a value from the first data element of the first structure in a first data element of the second structure and storing a value from the second data element of the first structure to a second data element in the second structure. The method may further comprise storing the metadata of the first structure in metadata of the second structure and storing, in the metadata of the second structure, a second path identifying a location of the first data element in the second structure.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The embodiments disclosed herein relate to encrypting data objects or files in a manner that allows the contents of the data objects of files, including encrypted contents, to be mapped to a new data object having a different data structure. This encryption approach may be useful in a scenario in which an application is split into two or more separate layers.

Figure 1:
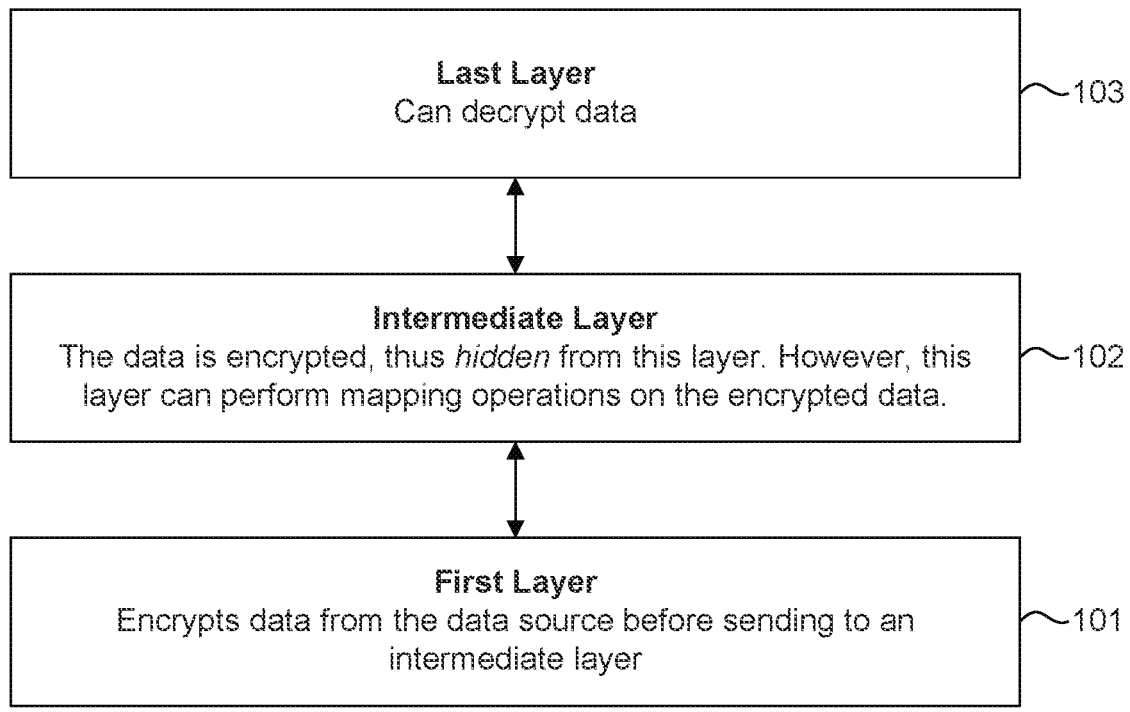
FIG. 1 is a block diagram illustrating layers and their capabilities to encrypt, decrypt, and reformat encrypted data according to embodiments disclosed herein.

FIG. 1 is a block diagram illustrating layers and their capabilities to encrypt, decrypt, and reformat encrypted data according to embodiments disclosed herein.

In one non-limiting example, an application is split into three layers. The first layer 101 may receive unencrypted data and encrypt the data before sending an encrypted copy of the data to an intermediate layer 102. The intermediate layer may not have the ability to decrypt the encrypted data but can perform mapping operations on the encrypted data. The mapping may comprise transforming the structure of the encrypted data, reformatting the data object or file into a new format, or moving the contents into a data object having a different data structure. In the disclosed embodiments, the mapping is discussed in relation to changing the structure of the data object. However, it is intended, and one of ordinary skill in the art would understand, that the principles described herein may be applicable to mapping an object to a different data format or file format. For example, a file formatted as JavaScript Object Notation (JSON) with encrypted values may be reformatted as an Extensible Markup Language (XML) file with encrypted values, without decrypting the encrypted values. A third layer may be configured to decrypt the encrypted data object.

Referring to FIG. 1, three layers are illustrated according to an embodiment. A first layer 101 may encrypt data from a data source, store the encrypted data in a data object having a first structure, and send the data object, including the encrypted data, to an intermediate layer 102. According to an embodiment the first layer 101 uses a symmetric encryption key to encrypt the data. According to another embodiment, the first layer uses an asymmetric encryption key to encrypt the data. The first layer 101 need not necessarily be capable of decrypting the encrypted data and need not necessarily have access to the decryption keys required to decrypt the encrypted data. The data may be any kind of data and the data source may be any data source.

The intermediate layer 102 may receive the data object containing the encrypted data from the first layer 101. According to an embodiment, the intermediate layer 102 may not be capable of decrypting the data. The intermediate layer 102 may be configured to reformat the data object, or map the data stored in the data object to a new data object having a second structure different from the first structure. The intermediate layer may be configured to perform reformatting or mapping functions without decrypting the encrypted data and without having access to the decryption keys. The intermediate layer 102 may send the data object to the last layer 103. According to an embodiment, the intermediate layer 102 may be configured to send the data object to the last layer without performing reformatting or mapping on the data object.

The last layer 103 may be configured to decrypt the data object. The last layer 103 may be configured to access the decryption key required to decrypt the encrypted data. According to an embodiment, the decryption key is stored in the data object as an encrypted data key. The last layer 103 may retrieve the encrypted data key from the data object, cause the encrypted data key to be decrypted to recover the original data key, and use the data key to decrypt the encrypted data contained in the data object.

Each layer may be implemented as a physical or logical computer system or an application layer, and transmission between layers or computer systems may occur over a network, or between separate layers of an application in a computing environment. Some embodiments may include more or fewer layers, or even just one layer. One of ordinary skill in the art would recognize that any number of intermediate layers, including zero, may exist between the first layer 101 and the last layer 103. In addition, the encryption, reformatting, and decryption may all occur within a single layer.

Figure 2:
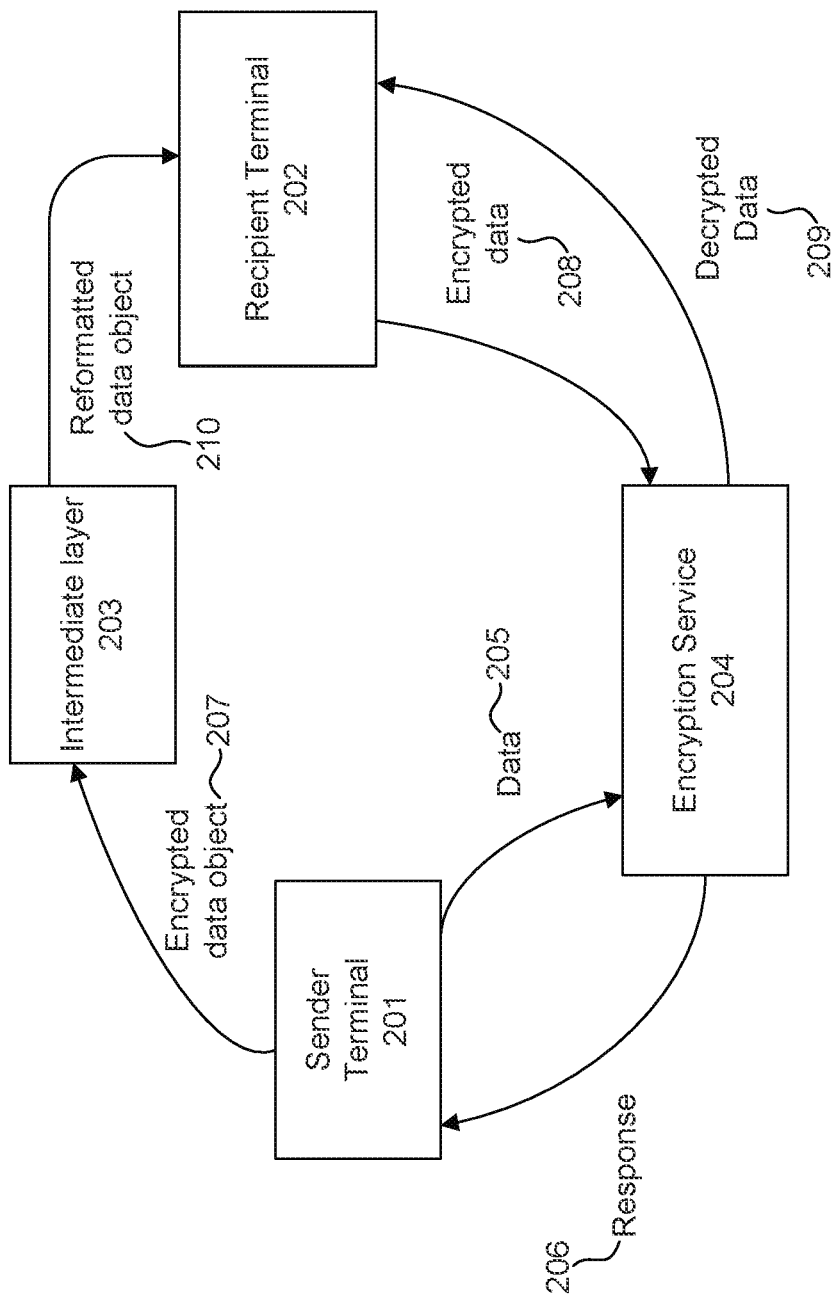
FIG. 2 is a block diagram illustrating encryption, transmission, and decryption performed across three application layers or terminals according to embodiments disclosed herein.

FIG. 2 is a block diagram illustrating encryption, transmission, and decryption performed across three application layers or terminals according to embodiments disclosed herein.

Some embodiments of the flexible format encryption system may be illustrated with reference to a sender terminal 201, a recipient terminal 202, an intermediate layer 203 and an encryption service 204. According to an embodiment, the sender terminal 201 is configured to use the encryption service 204 to perform encryption or to generate encryption keys.

According to an embodiment, the sender terminal 201 may send data 205 to the encryption service 204. The data 205 may comprise a request for an encryption key. According to an embodiment, the encryption service 204 returns a response 206 to the sender terminal 201. The response 206 may comprise a data key and/or an encrypted data key. The data key may be a symmetric encryption key generated from a secure asymmetric master key, and the encrypted data key may be the symmetric encryption key encrypted using the master key.

According to an embodiment, the sender terminal 201 may be configured to use the data key to encrypt the data object. Encryption may be performed at the field level, which enables the one or more intermediate layers to transform a data object containing encrypted data without decrypting the data object. As a non-limiting example, a data object having a first structure may have the following class definition:

```
class ExampleDataObject {
    @Encrypt
    private String sensitiveInfo;
    private String nonSensitiveInfo;
    private ExampleNestedObject exampleNestedObject;
}
class ExampleNestedObject {
    @Encrypt
    private Integer encryptThis;
    private Integer dontEncryptThis;
}
```

The fields that need to be encrypted may be annotated with the @Encrypt custom annotation in the class definition. In the non-limiting example data object above, @Encrypt may represent an indicator or flag identifying a first data element containing sensitive data to be encrypted. Data elements of a data object may be any of a variety of data types, including another data object. An instance of a data object having the first structure may be represented in plain text as follows:

```
"exampleDataObject": {
    "sensitiveInfo": "the secret password is 1234",
    "nonSensitiveInfo": "Capital One is on a mission
    to change banking for good",
    "exampleNestedObject": {
        "encryptThis": 1234,
        "dontEncryptThis": 5678
    }
}
```

A data object may comprise a structure with one or more data elements. Each data element may be represented by a pair comprising a name and a value. The name may be a string contained in quotation marks and the value may comprise a number, a string, a boolean, an array, or a data object. According to an embodiment, the data object may be represented using the JavaScript Object Notation (JSON) standard.

According to an embodiment, the sender terminal 201 may encrypt the values identified by the @encrypt flag using the data key. The encrypted example data object, having the first structure, may be expressed in plain text as follows:

```
"encryptedDataObject": {
    "sensitiveInfo": "",
    "nonSensitiveInfo": "Capital One is on a mission
    to change banking for good",
    "exampleNestedObject": {
        "encryptThis": 0,
        "dontEncryptThis": 5678
    },
    "encryptionMetadata": {
        "encrypted.sensitiveInfo":
        "ABCEFGHIJKABCD123456"
        "encrypted.exampleNestedObject.encryptThis":
        "ABCEFGHIJKEFGHIJ4566"
        "key.ABCEFGHIJK":
        "ABCEFGHIJKRWEGWEFVADGFAEFG235DF4"
    }
}
```

Although not all data elements of the data object are necessarily encrypted, for convenience, a data object with one or more encrypted values may be referred to as an encrypted data object 207. In the encrypted data object 207, each encrypted field may have its value replaced with an appropriate zero value or null. For example, if the encrypted field is a string, the zero value may be an empty String, and if the encrypted field is an integer, the zero value may be 0, etc. The encrypted values may be added to an embedded field in the data object named encryptionMetadata. Each encrypted value may be added to the encryptionMetadata field along with the path to the field corresponding to the encrypted value. According to an embodiment, the path may be stored in a name field of the encrypted data object 207. In the example encrypted data object, the path is also prefixed with the word "encrypted", indicating that an encrypted value is stored in the value following the name field containing the path. For example, the path "encrypted.sensitiveInfo" indicates that the encrypted value "ABCEFGHIJKABCD123456" corresponds to the field named "sensitiveInfo" at the top level of the example encrypted data object. The encrypted data key may also be stored in the encryptionMetadata field.

According to an embodiment, any of the encrypted field values stored in the encryptionMetadata field, including the encrypted data key, may be appended with a decryption identifier. In the example encrypted data object above, the decryption identifier comprises the characters "ABCDEFGHIJK" added as a prefix to the encrypted values stored in the encryptionMetadata field, including the encrypted data key. According to an embodiment, the decryption identifier may be used to identify the master key used to generate the data key and to encrypt the data key. During a decryption process, the master key may be used for decrypting the encrypted data key to recover the data key. The recovered data key may then be used to decrypt the encrypted field values stored in the encryptionMetadata field. After encrypting the data object, the sender terminal 201 may send the encrypted data object 207, including the encrypted data key, to an intermediate layer 203.

According to another embodiment, the data 205 comprises the data object to be encrypted and the encryption service 204 returns the encrypted data object 207, including the encrypted data key, to the sender terminal 201. The sender terminal 201 may then send the received encrypted data object 207, including the encrypted data key, to the intermediate layer 203.

The intermediate layer 203 may be unable to decrypt the encrypted data object 207, but may be able to reformat the encrypted data object 207 through a mapping operation. The data object may be sent through any number of intermediate layers. For non-limiting illustration purposes only, FIG. 2 depicts one intermediate layer.

If an intermediate layer needs to reformat or transform the original encrypted data object 207, it may perform a mapping operation on the encrypted data object 207. The mapping operation may create a dynamic proxy around both the original encrypted data object 207 and a new object that will contain the encrypted fields. These dynamic proxies may enable the ability to capture the paths identifying the encrypted fields to be mapped. Once a path from the original encrypted data object 207, and a new path for the new reformatted data 210 object are captured, a value may be copied from the embedded encryptionMetadata field in the original encrypted object to the encryptionMetadata field of the new object. The copied value may be associated with the new path to the corresponding field in the new object. After the mapping operation is applied, the resulting reformatted data object 210 can be decrypted as if it were the encrypted data object 207 by using a decrypt method of the embodiments disclosed herein.

As a non-limiting example, an example reformatted data object with a second structure may have a class definition as follows:

```
class ReformattedObject {
    private String sensitiveString;
    private String nonSensitiveString;
    private Integer sensitiveInteger;
    private Integer nonSensitiveInteger;
}
```

One difference between the example reformatted data object and the original example encrypted data object is that the example reformatted data object lacks a nested object, e.g., ExampleNestedObject. However, like the original example encrypted data object, the example reformatted data object comprises two string data elements and two integer data elements.

As a non-limiting example of the mapping operation, refer to the plain text representation of the original example encrypted data object, repeated here for convenience:

```
"encryptedDataObject": {
    "sensitiveInfo": "",
    "nonSensitiveInfo": "Capital One is on a mission
    to change banking for good",
    "exampleNestedObject": {
        "encryptThis": 0,
        "dontEncryptThis": 5678
    },
    "encryptionMetadata": {
        "encrypted.sensitiveInfo":
        " ABCEFGHIJKABCD123456"
        "encrypted.exampleNestedObject.encryptThis":
        "ABCEFGHIJKEFGHIJ4566"
```

-continued

```
    "key.ABCEFGHIJK":
      "ABCEFGHIJKRWEGWEFVADGFAEFG235DF4"
  }
}
```

When reformatted to the example reformatted data object having the second structure, the example reformatted data object may be represented in plain text as follows:

```
"reformattedDataObject": {
    "sensitiveString": "",
    "nonSensitiveString": "Capital One is on a
    mission to change banking for good",
    "sensitiveInteger": 0,
    "nonSensitiveInteger": 5678,
    "encryptionMetadata": {
      "encrypted.sensitiveString":
      "ABCEFGHIJKABCD123456"
      "encrypted.sensitiveInteger":
      "ABCEFGHIJKEFGHIJ4566"
      "key.ABCEFGHIJK":
      "ABCEFGHIJKRWEGWEFVADGFAEFG235DF4"
    }
}
```

As shown in the encryptionMetadata field of the example reformatted data object, the paths identifying the locations of the encrypted fields have changed. The path encrypted.sensitiveInfo in the original example encrypted data object has become encrypted.sensitiveString in the example reformatted data object, and the path encrypted.exampleNestedObject.encryptThis in the original example encrypted data object has become encrypted.sensitiveInteger in the example reformatted data object. A difference in structure or format may result in the paths stored in the reformatted data object 210 being different from the paths stored in the original encrypted data object 207.

The intermediate layer 203 may send the reformatted data object 210 to the recipient terminal 202. It should be understood that the sender terminal 201, intermediate layer 203, and recipient terminal 202 may be physically distinct locations, such as separate computer systems or terminals, or merely different layers of an application or communication infrastructure. The recipient terminal 202 may be configured to decrypt the reformatted data object 210 directly or to use the encryption service 204 to decrypt the reformatted data object 210.

To decrypt a data object that was encrypted according to embodiments disclosed herein, the recipient terminal 202, or the encryption service 204, may parse the encryptionMetadata field and retrieve the embedded encrypted data key. The encrypted data key may be decrypted using the master key. The correct master key may be identified based on the decryption identifier. According to an embodiment, the decryption identifier comprises a prefix on the encrypted data key. The decrypted data key may be used to decrypt encrypted values in the encryptionMetadata field. After a value is decrypted, the field matching the path contained in the encryptionMetadata is replaced with the decrypted value.

According to an embodiment, the recipient terminal 202 sends encrypted data 208 to the encryption service 204. The encryption service 204 may be configured to return decrypted data 209 to the recipient terminal 202. According to an embodiment, the encrypted data 208 comprises the encrypted data key and the decrypted data 209 comprises a decrypted data key. The recipient terminal 202 may retrieve the encrypted data key from the encrytpionMetadata field of the reformatted data object 210 and send the encrypted data key to the encryption service 204

The encryption service 204 may use a decryption identifier, such as the prefix attached to the encrypted data key, to identify an appropriate master key and use the identified master key to decrypt the encrypted data key. The decrypted data key may be sent back to the recipient terminal 202. The recipient terminal 202 may use the decrypted data key to decrypt the encrypted data object 207 and recover the data object.

According to another embodiment, the encrypted data 208 comprises the reformatted data object 207, including the encrypted data key. The encryption service 204 may be configured to extract the encrypted data key from the encryptionMetadata field of the reformatted object 210 and use the master key to decrypt the encrypted data key. The encryption service 204 may then use the decrypted data key to decrypt the reformatted data object. The Encryption service 204 may be configured to return the decrypted data object to the server in the decrypted data 209.

Although a first structure and second structure are illustrated with specific examples, it should be understood that the disclosed embodiments are applicable to any structure or format.

Figure 3:
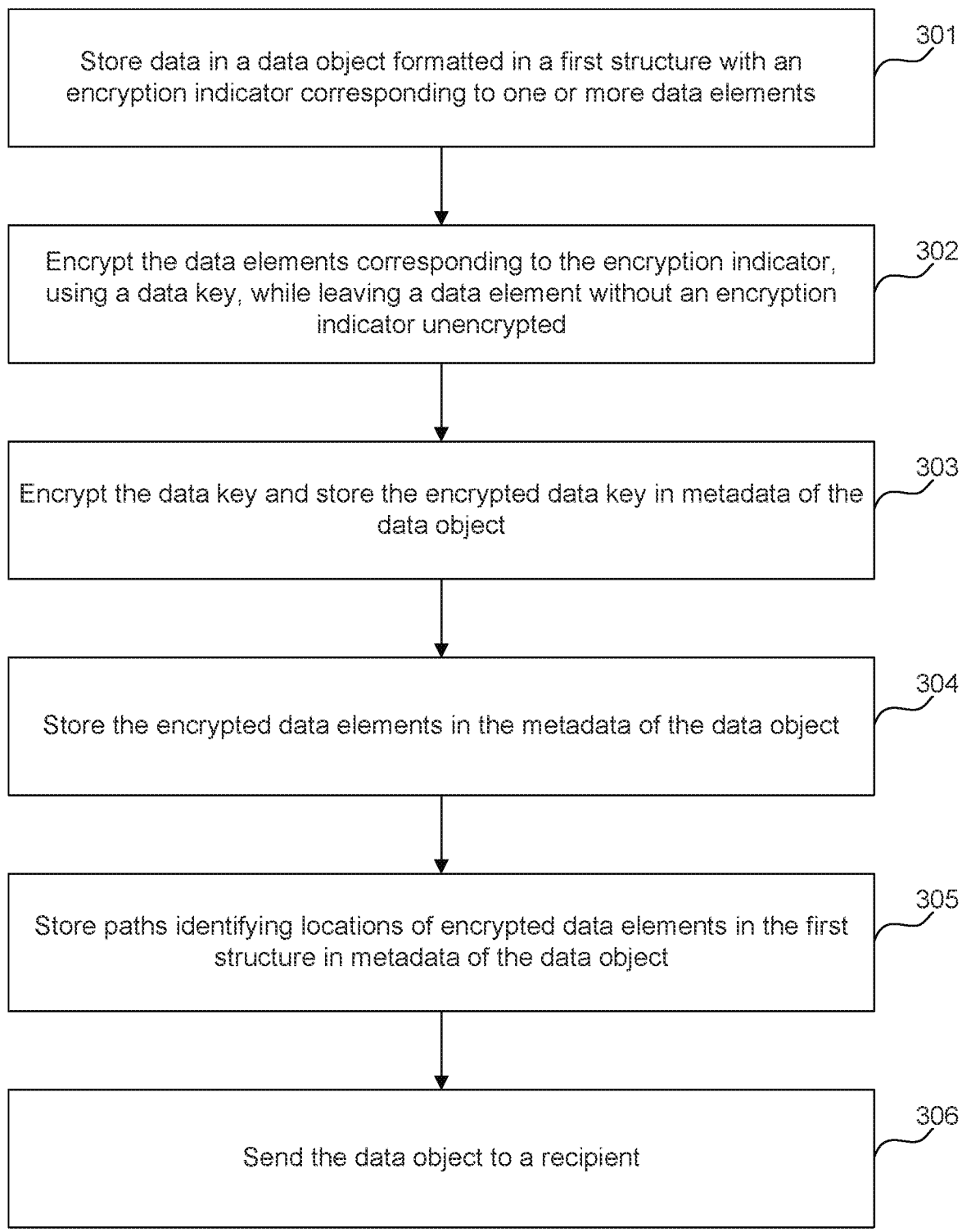
FIG. 3 is a flow chart illustrating encryption of a data object according to embodiments disclosed herein.

FIG. 3 is a flow chart illustrating encryption of a data object according to embodiments disclosed herein.

At step 301, the one or more processors store data in a first data object formatted in a first structure. The first data object may include one or more encryption indicators corresponding to one or more data elements in the first data object. The encryption indicator may indicate that the corresponding data element contains sensitive data and is to be encrypted.

At step 302, the one or more processors encrypt the data elements corresponding to the encryption indicator. Encryption may be performed using a data key. The data key may be generated internally, received from another third-party service, or received from an encryption service 204. Data elements in the first data object that do not have an encryption indicator may be left unencrypted.

At step 303, the one or more processors encrypt the data key and store the encrypted data key in metadata of the encrypted first data object. The data key may be encrypted locally or an encryption service 204 may be used to generate the data key and to encrypt the data key.

At step 304, the one or more processors store the encrypted data elements in the metadata of the encrypted first data object. At step 305, the one or more processors store paths in the metadata of the encrypted first data object. The paths may identify the locations of the encrypted data elements in the first structure of the first data object.

At step 306, the encrypted first data object may be sent to a recipient. The recipient may be a final recipient or an intermediate layer 203 that may reformat the encrypted first data object before the reformatted data object is sent to the final recipient.

Figure 4:
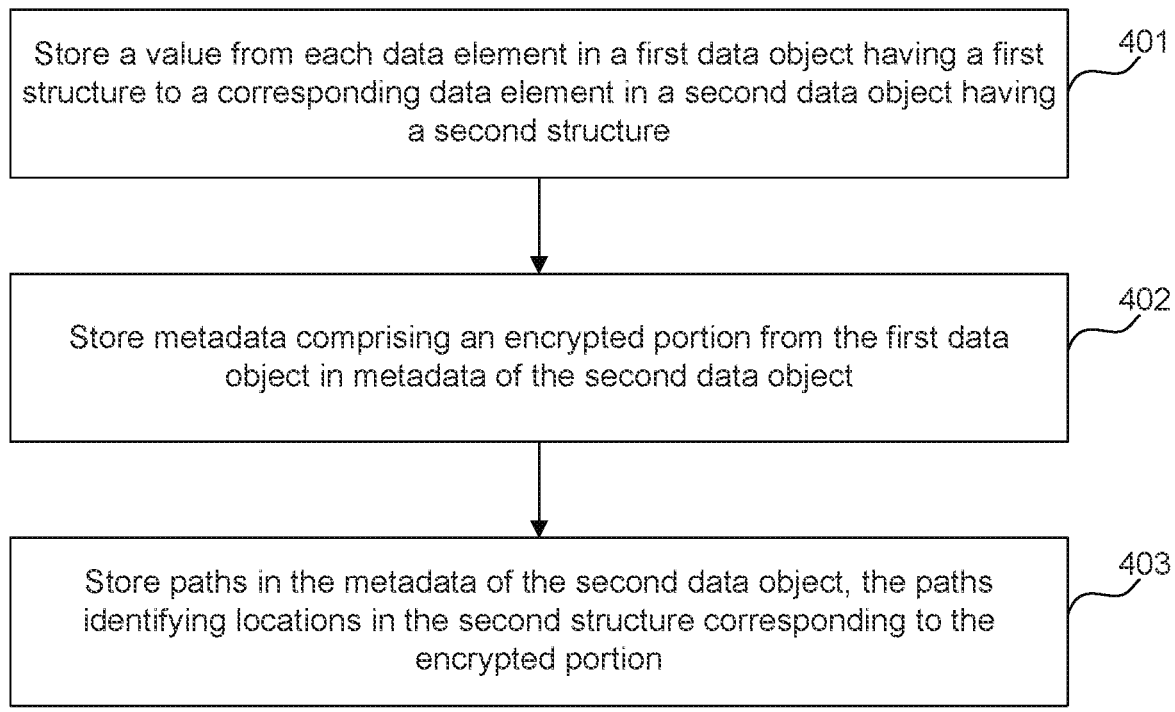
FIG. 4 is a flowchart illustrating a method of reformatting an encrypted data object according to embodiments disclosed herein.

FIG. 4 is a flowchart illustrating a method of reformatting an encrypted first data object according to embodiments disclosed herein.

At step 401, one or more processors store a value from each data element in the first data object having the first structure to a corresponding data element in a second data object having a second structure. The storage of data elements from one data object having a first structure to another data object having a second structure may be referred to as mapping. According to an embodiment, the mapping of data elements in the first structure to corresponding data elements in the second structure may be performed based on matching names of the data elements. According to another embodiment, the mapping may be performed based on a predetermined set of rules for mapping objects or files of a first known structure or format to a second known structure or format.

According to an embodiment, the mapping may be performed based on hard coded mapping instructions in a call to a mapping function. For example a function call to a map( ) function of an encryption SDK may explicitly map the data elements between the two structures as follows:

```
MappedObject mappedObject =
encryptionSdk.map(exampleObject, new MappedObject( ),
    (example, mapped) ->
    mapped.setSensitiveString(example.getSensitiveInfo( ))
    .setNonSensitiveString(example.getNonSensitiveInfo( ))
    .setSensitiveInteger(example.getExampleNestedObject(
    ).getEncryptThis( ))
    .setNonSensitiveInteger(example.getExampleNestedObject(
    ).getDontEncryptThis( ))
);
```

At step 402, the one or more processors store an encrypted portion of metadata in the first data object to metadata of the second data object. The encrypted portion may comprise one or more encrypted values of the data object. According to an embodiment, the encrypted portion may comprise the encrypted data key stored in the metadata of the first data object.

At step 403, the one or more processors store paths in the metadata of the second data object having the second structure. The paths may identify locations in the second structure corresponding to the encrypted portion. Each path may be stored in a name field corresponding to a value field that stores the encrypted value corresponding to the path. A path to a value's location in the second structure may be different from a path to the same value's location in the first structure. The correct path for the second structure may be generated based on the mapping between the first structure and the second structure. A path from the first structure can be used to identify an encrypted value's location in the first structure, the mapping defines or identifies a relationship between the encrypted value's location in the first structure and the encrypted value's location in the second structure, and a path can be generated for the encrypted value's location in the second structure. The generated path may be stored in the metadata of the second data object.

Figure 5:
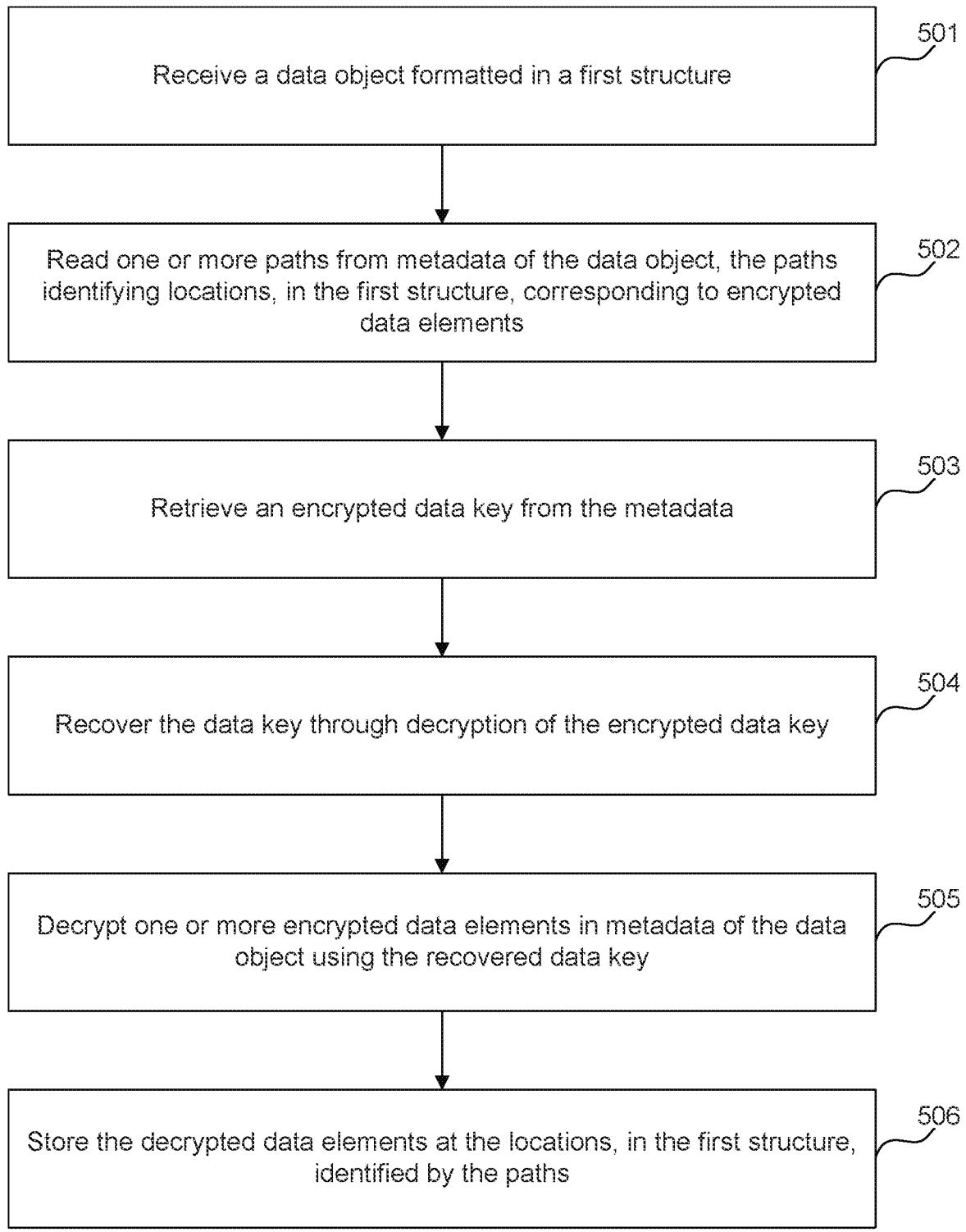
FIG. 5 is a flowchart illustrating a method of receiving and decrypting an encrypted data object according to embodiments disclosed herein.

FIG. 5 is a flowchart illustrating a method of receiving and decrypting an encrypted data object 207 according to embodiments disclosed herein.

A data object need not be reformatted from a first structure to a second structure before being decrypted. According to an embodiment, the decryption process can be performed, without modification, on an encrypted data object 207 regardless of data structure.

At step 501, one or more processors receive a data object formatted in a first structure. The data object may comprise metadata storing encrypted values, paths to the locations in the first structure corresponding to the encrypted values, and an encrypted data key.

At step 502, the one or more processors read one or more paths from the metadata of the data object. The paths may identify locations, in the first structure, corresponding to encrypted data elements of the data object.

At step 503, the one or more processors retrieve an encrypted data key from the metadata. According to an embodiment, the encrypted data key may have a decryption identifier appended to it. The decryption identifier may be used to identify a master key that may be used to decrypt the encrypted data key.

At step 504, the one or more processors recover the data key through decryption of the encrypted data key. According to an embodiment, the encrypted data key may be sent to an encryption service for decryption. The encryption service may use the decryption identifier appended to the encrypted data key to identify a master key and use the master key to decrypt the encrypted data key.

At step 505, the one or more processors decrypt the one or more data elements in the metadata of the data object using the recovered data key.

At step 506, the one or more processors store the decrypted data elements at the locations, in the first structure, identified by the paths that were read in step 502. The metadata element of the encrypted data object 207 may be deleted to restore the data object back to its original form.

Figure 6:
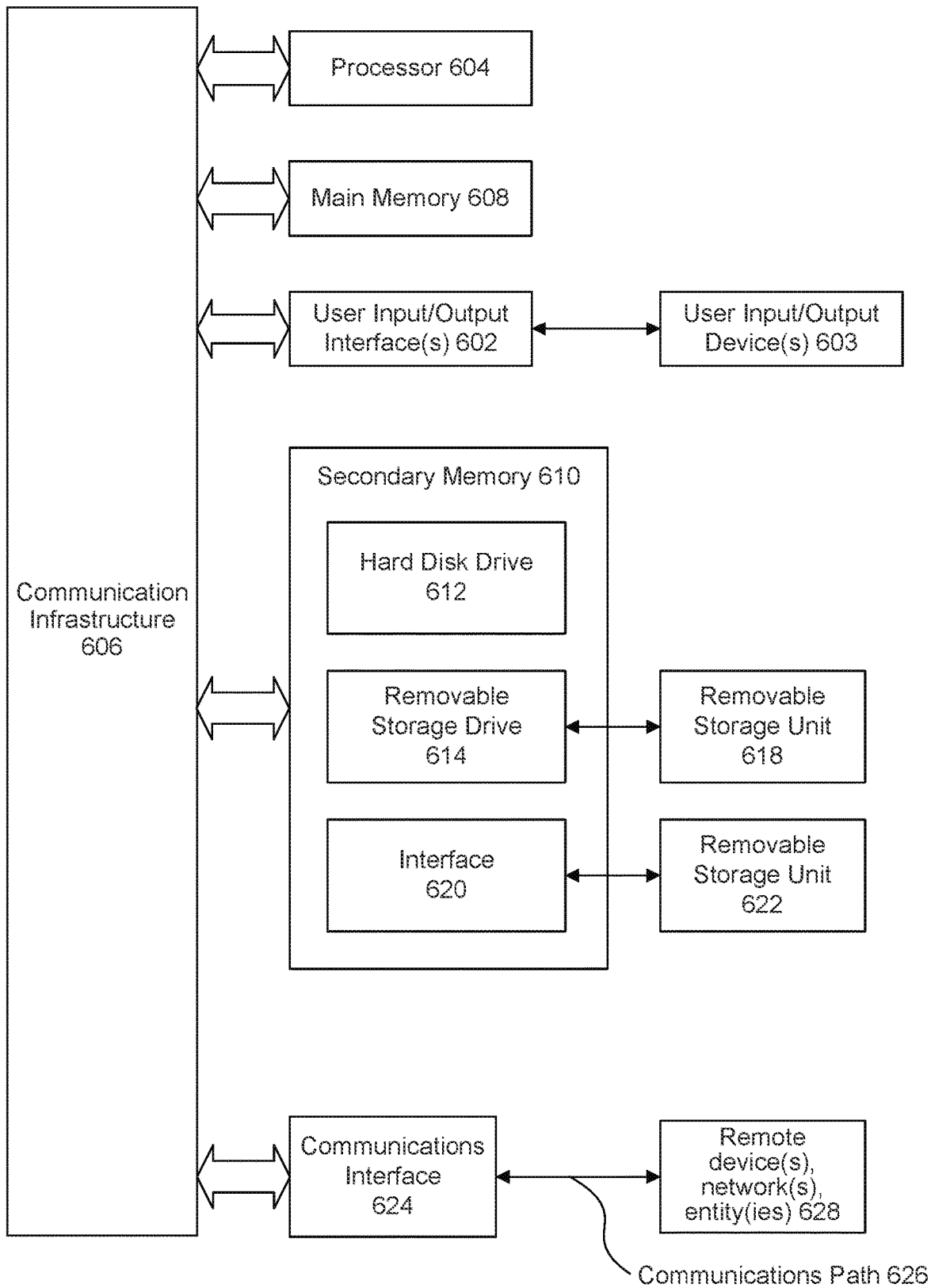
FIG. 6 is a block diagram of a non-limiting example computer system useful for implementing various embodiments disclosed herein.

FIG. 6 is a block diagram of a non-limiting example computer system useful for implementing various embodiments disclosed herein.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache and/or registers. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of encryption, the method comprising:
  encrypting, at a first layer of a multilayered application and via an unencrypted version of a data key for a first data object, a first data element of the first data object, wherein a second data element of the first data object is unencrypted;

reformatting, at a second layer of the multilayered application, the first data object into a second data object comprising the encrypted first data element, the unencrypted second data element, and an encrypted version of the data key, wherein the encrypted version of the data key is inaccessible at the second layer; and decrypting, at a third layer of the multilayered application via the unencrypted version of the data key, the encrypted first data element of the second data object.

2. The method of claim 1, wherein the first data object further comprises an encryption indicator corresponding to the first data element, and wherein the encrypting the first data element of the first data object comprises encrypting the first data element responsive to the encryption indicator.

3. The method of claim 1, further comprising generating the encrypted version of the data key using a secure asymmetric master key.

4. The method of claim 1, further comprising storing the encrypted version of the data key in metadata of the first data object.

5. The method of claim 4, wherein the metadata indicates a location of the first data element in the first data object.

6. The method claim 4, wherein the metadata comprises an identifier of a master key used to identify the unencrypted version of the data key.

7. The method of claim 1, further comprising sending the second data object to a recipient device.

8. A non-transitory computer-readable medium having instructions stored thereon that, when executed by at least one computing device, cause the at least one computing device to perform operations comprising:

encrypting, at a first layer of a multilayered application and via an unencrypted version of a data key for a first data object, a first data element of the first data object, wherein a second data element of the first data object is unencrypted;

reformatting, at a second layer of the multilayered application, the first data object into a second data object comprising the encrypted first data element, the unencrypted second data element, and an encrypted version of the data key, wherein the encrypted version of the data key is inaccessible at the second layer; and decrypting, at a third layer of the multilayered application via the unencrypted version of the data key, the encrypted first data element of the second data object.

9. The non-transitory computer-readable medium of claim 8, wherein the first data object further comprises an encryption indicator corresponding to the first data element, and wherein the encrypting the first data element of the first data object comprises encrypting the first data element responsive to the encryption indicator.

10. The non-transitory computer-readable medium of claim 8, further comprising generating the encrypted version of the data key using a secure asymmetric master key.

11. The non-transitory computer-readable medium of claim 8, further comprising storing the encrypted version of the data key in metadata of the first data object.

12. The non-transitory computer-readable medium of claim 11, wherein the metadata indicates a location of the first data element in the first data object.

13. The non-transitory computer-readable medium of claim 11, wherein the metadata comprises an identifier of a master key used to identify the unencrypted version of the data key.

14. The non-transitory computer-readable medium of claim 8, further comprising sending the second data object to a recipient device.

15. A system, comprising:

a memory; and at least one processor coupled to the memory and configured to perform operations comprising:

encrypting, at a first layer of a multilayered application and via an unencrypted version of a data key for a first data object, a first data element of the first data object, wherein a second data element of the first data object is unencrypted;

reformatting, at a second layer of the multilayered application, the first data object into a second data object comprising the encrypted first data element, the unencrypted second data element, and an encrypted version of the data key, wherein the encrypted version of the data key is inaccessible at the second layer; and decrypting, at a third layer of the multilayered application via the unencrypted version of the data key, the encrypted first data element of the second data object.

16. The system of claim 15, wherein the first data object further comprises an encryption indicator corresponding to the first data element, and wherein the encrypting the first data element of the first data object comprises encrypting the first data element responsive to the encryption indicator.

17. The system of claim 15, further comprising generating the encrypted version of the data key using a secure asymmetric master key.

18. The system of claim 15, further comprising storing the encrypted version of the data key in metadata of the first data object.

19. The system of claim 18, wherein the metadata indicates a location of the first data element in the first data object.

20. The system of claim 18, wherein the metadata comprises an identifier of a master key used to identify the unencrypted version of the data key.

* * * * *